UNITED STATES PATENT OFFICE.

THÉODORE TRUCHELUT AND AMEDEE AUGUSTE ROCHEREAU, OF PARIS, FRANCE.

PROCESS OF REPRODUCING ORIGINALS IN COLORS.

SPECIFICATION forming part of Letters Patent No. 667,349, dated February 5, 1901.

Application filed April 17, 1900. Serial No. 13,240. (No specimens.)

*To all whom it may concern:*

Be it known that we, THÉODORE TRUCHELUT, residing at 34 Quai des Orfèvres, and AMEDEE AUGUSTE ROCHEREAU, residing at 56 Rue de la Victorie, Paris, France, citizens of the French Republic, have invented a new and useful Process of Reproducing Originals in Colors, of which the following is a specification.

The object of our invention is a process for reproducing originals in colors.

According to our process the original work of art (design, painting, water-color, crayon-drawing, pastel, &c.) is prepared by the artist by the aid of fundamental colors from which the entire gamut of tones and intermediate shades can be obtained by mixing, just as is done ordinarily. These fundamental colors, however, must not be selected without consideration of their chemical composition, but, on the contrary, must consist of substances whose chemical and actinic properties are such that under the treatment to which the original is exposed the whole of the colors in the original except one can be successively and momentarily eliminated—that is to say, rendered inactive. Thus if we suppose an original prepared by means of the three fundamental colors—red, blue, and yellow—we first treat the original in such a manner as to eliminate for the moment, say, the yellow and blue. We then take a photographic negative or plate of the original, which negative or plate will consequently be a photograph of merely the red portion of the original. We next subject the original to a second treatment by means of which the blue is left inactive, while at the same time the activity of the red is suppressed and that of the yellow restored. A new photograph negative or plate of the original taken under these conditions will represent solely the yellow part of the original. By means of a third treatment we then suppress the activity of the yellow, leave the red inactive, and restore the activity of the blue, so that on taking a third negative or plate the latter will merely reproduce the blue part of the original. We have now three plates which when superimposed will reproduce the original in its entirety with absolute precision. Of course in so far as the reproduction of the original by printing is concerned this object is effected by preparing from the above-mentioned plates, by means of the usual methods, printing-plates, with which the printing in colors can be performed in the usual manner.

We think it right to mention that others before us have attempted a process for reproducing originals in colors by taking successive photographic plates of the original, interposing at each operation between the original and the lens a colored screen which in each case allowed only a certain class of colored rays to pass through. This process, however, presents so many difficulties in manipulation and so many inconveniences and is, moreover, so distinct from the principle of our invention, so far as concerns the means employed for attaining the industrial object in view, that we only mention it in order to define the sphere of our invention.

Our process is evidently also applicable to the reproduction of originals containing only two of the fundamental colors red, blue, and yellow or mixtures thereof. Consequently the number of treatments to which the original has to be exposed and the number of plates to be prepared will vary accordingly.

We will now proceed to indicate, as an example and to give a clear idea of our invention, a specific method of executing the general process already described.

We will assume the case of an original in the three colors yellow, red, and blue. To prepare the original, we employ mercuric iodid for the red, argentic ferrocyanid for the yellow, and as for the blue (which does not come into photography) we make use of a mixture of anilin-blue lake (or Prussian blue) with lead sulfate. These colors, finely ground separately along with white of egg, (egg albumen,) gum, fish-glue, or other agglutinant vehicles and made up in the shape of blocks, crayons, liquid colors, &c., enable the artist using them in combination to produce all shades of combinations of color. When completed, the original is subjected to a series of baths, which in the special case now under consideration are as follows: By the aid of a solution of barium chlorid or of the chlorid of some other alkali metal we cause the yellow to disappear, and as the blue behaves in photography like white—that is, it does not come out, or hardly so, in a photographic positive—there remains only the red to be photographed. We therefore take the first plate. Next, by means of potassium iodid, we reduce the silver salt constituting the yellow, and in so doing cause the yellow to reappear, the potassium iodid at the same time causing the red to vanish. Having now no other active material on the original, except that composing the yellow portion, we take the second plate. In the third stage by removing the reduced silver by the aid of potassium cyanid we have only the blue left. This we develop, so far as the lead salt in the mixture is concerned, by means of sodium sulfid or other alkali sulfid and then take the third plate. To sum up, according to this method of procedure the operation ought to be conducted in the following manner, preparing the original by means of colors of the subjoined composition: red, mercuric iodid; yellow, argentic ferrocyanid; blue, mixture of Prussian blue and lead sulfate, each ground in fish-glue.

Baths and washings—taking plates:

First. (a) To remove the yellow, the original is immersed in the barium-chlorid solution, and acetaldehyde ($C_2H_4O$) is added to the barium-chlorid solution. No stirring should be practiced for a quarter of an hour in order that the acetaldehyde contained in the solution may precipitate the fish-glue. After this period is at an end the bath is tilted. (b) Wash in pure water taking care that the water-jet does not remove the pellicle or layer of color. (c) Take the first plate, (red.)

Second. (a) Enter the original in the potassium iodid solution. The yellow will reappear. Agitate until the red has vanished. (b) Wash as above, (1b.) (c) Take the second plate, (yellow.)

Third. (a) Plunge the original into the potassium-cyanid solution. Agitate until the final traces of yellow have disappeared. (b) Wash carefully with pure water for a considerable time. (c) Immerse the original in the sodium-sulfid solution. The blue will immediately turn black. (d) Wash with pure water. (e) Take the third plate, (blue.)

We desire to state here that we make no general claim in respect to the reactions described above and which are already well known. We only draw them from public sources in order to apply them to the realization of our new process.

From what has been stated above persons acquainted with art will readily understand that our process is not restricted to the indicated specific composition of the primary colors nor to the reagents employed to render them momentarily active or inactive.

Thus to sum up it is sufficient for the primary colors used to be of such composition that they may by subjection to direct action on their constituent materials be rendered at will momentarily active or inactive in a photographic sense.

In conclusion it may be stated that by our process it is possible to produce a printed image of a statuette or similar object. To do this, the object is painted with the colors mentioned and is then treated in exactly the same manner as if it were a flat original and the photographic negatives taken in the same manner.

Any suitable material may be used upon which to make the final prints, such as paper, cloth, linen, &c.

Among the numerous advantages offered by our process we would specially particularize the rapidity of execution, pecuniary economy, entire suppression of retouching, and the mathematical accuracy of the superimposition of the plates.

We claim—

1. The process of preparing an original work of art destined to be reproduced in colors, which consists in composing fundamental colors of constituent materials capable of being rendered temporarily active or inactive at will by direct action on their constituent materials, and then using such colors in combination to produce the original.

2. The process of reproducing original works of art in colors, which consists in composing fundamental colors of constituent materials capable of being rendered temporarily active or inactive at will by direct action on their constituent materials, then using such colors in combination to produce the original, then treating the original to successively render active one only of the fundamental colors the others being rendered inactive, and making a copy or reproduction of such parts of the original as contain the temporarily-active fundamental color, then producing printing-cliches from said copies or reproductions, and finally taking superimposed impressions in the respective primary colors from said printing-cliches.

In testimony that we claim the foregoing as our invention we have signed our names in presence of two subscribing witnesses.

THÉODORE TRUCHELUT.
AMÉDÉE AUGUSTE ROCHEREAU.

Witnesses:
CHARLES THIERRY,
EDWARD P. MACLEAN.